United States Patent [19]
McKee et al.

[11] 3,709,524

[45] Jan. 9, 1973

[54] DOCUMENT IDENTIFICATION AND PROTECTION STEM

[75] Inventors: James B. McKee, Woodson Terrace; Jon L. Canaday, Edmunson Terrace, both of Mo.

[73] Assignee: Aid For Business, Incorporated, Woodson Terrace, Mo.

[22] Filed: June 16, 1971

[21] Appl. No.: 153,674

[52] U.S. Cl. .............................282/22 R, 118/31.5
[51] Int. Cl. .................................................B41l 1/24
[58] Field of Search ............118/31.5; 117/.5; 283/7; 282/1 B, 22, 23; 40/158 R; 250/71 R

[56] References Cited

UNITED STATES PATENTS

| | | | |
|---|---|---|---|
| 1,380,506 | 7/1921 | Voght | 118/31.5 UX |
| 1,536,991 | 5/1925 | Varetoni | 118/31.5 |
| 1,937,575 | 12/1933 | Joyce | 117/.5 |
| 2,066,535 | 1/1937 | Lucas | 117/.5 |
| 2,153,684 | 4/1939 | Ballard | 118/31.5 |
| 2,198,802 | 4/1940 | Brady | 283/7 |
| 2,500,612 | 3/1950 | Krogh | 118/31.5 |
| 2,998,983 | 9/1961 | Digate | 282/1 B |
| 3,227,474 | 1/1966 | Hoeflinger | 283/7 |
| 3,258,277 | 6/1966 | Schuster | 282/22 R |
| 3,664,910 | 5/1971 | Hollie | 283/7 UX |

*Primary Examiner*—Morris Kaplan
*Attorney*—Koenig, Senniger, Powers & Leavitt

[57] ABSTRACT

A sales slip packet includes a sales slip, a document card adapted for use in high-speed data processing apparatus and including a fingerprint receiving area, pressure sensitive copying means for transferring data from the sales slip to the document card, and a removable finger print medium wafer.

15 Claims, 7 Drawing Figures

PATENTED JAN 9 1973

3,709,524

James B. McKee,
Jon L. Canaday,
Inventors
Koenig, Senniger,
Powers and Leavitt,
Attorneys

DOCUMENT IDENTIFICATION AND PROTECTION STEM

BACKGROUND OF THE INVENTION

This invention relates to a document adapted for use as a system for identification of the signer of the document and for protection against a fraudulent credit transaction.

More particularly, this invention is concerned with providing a fingerprint identification system for positively identifying the signer of a credit card sales slip, check or other credit transaction document at a time subsequent to the sale or transaction. With the increased use of credit cards for retail sales, the fraudulent use of lost, stolen or counterfeit credit cards has become a major problem and expense to the customers who hold and use credit cards, to the retail merchants who accept credit cards, and to the credit companies which own and administer the various credit card systems. Credit companies now employ various safeguards for preventing the fraudulent use of their credit cards and make a strong effort to apprehend persons fraudulently using their credit cards, but the financial losses resulting from the fraudulent use of credit cards have continued to grow at an alarming rate. Furthermore, convictions of persons accused of unauthorized use of credit cards are difficult to obtain because it is difficult to prove that the person apprehended is in fact the signer of the credit card sales slip. Unless there is a witness at the trial who saw the accused sign the sales slip in question, handwriting experts are the only means now available for proving the signature on the sales slip is that of the accused. Often times, however, handwriting experts are not able to establish that the signature on the sales slip in question is that of the accused because a person fraudulently signing a sales slip will often disguise his handwriting and because the signature on the sales slip which the expert is examining is usually a carbon copy of the original signature.

Identification systems are known which include having the signer of a document imprint one or more of his fingerprints thereon at the time of signing for identification purposes. Examples of such prior art identification systems are shown in U.S. Pat. Nos. 1,374,208, 2,198,802, 2,500,612 and 3,447,818.

However, prior art identification and protection systems each have one or more of the following disadvantages: (1) the requirement of a supply of a fingerprinting medium permanently affixed to the document which would interfere with data processing of the document, (2) the requirement of a specially constructed document which adds to its cost and would interfere with data processing, and (3) the requirement of a special chemically treated document which aids in imprinting the fingerprint. Because of these disadvantages, no prior art identification and protection system such as above described is satisfactory for use for credit card sales slips.

SUMMARY OF THE INVENTION

Among the several objects of this invention may be noted the provision of a document adapted for use as a system for identifying the signer of the document by means other than the signature thereon; the provision of such a document which deters persons from fraudulently signing the document; the provision of such a document which may be processed by conventional high-speed data processing equipment; the provision of such a document which does not require special construction or special chemical treatment for fingerprint imprinting purposes; the provision of such a document which may be included in a conventional credit card sales slip packet and which permits information embossed on a customer's credit card to be imprinted on the sales slip packet by conventional credit card imprinting machines; the provision of such a document which is simple and easy to use and which does not soil the document, the signer of the document or other persons handling the document; and the provision of such a document which is of relatively low cost.

In general, a document or credit card sales slip packet of this invention is adapted for signing by an authorized person to whom a credit card has been issued and further adapted for use as a system for identifying the actual signer of the packet, the latter having a plurality of members including at least one thin, flexible sales slip, and a relatively thick card having a substantially constant thickness and adapted for high-speed processing by data processing equipment. The card has an area on which the signer of the packet is required to imprint one of his fingerprints. The packet further includes a supply of a fingerprinting medium which is immediately associated with the card for enabling the signer of the packet to press one of his fingertips thereon to transfer the fingerprinting medium over a sufficient area of his fingertip to imprint an identifiable fingerprint on the abovesaid area of the card. The supply of fingerprinting medium is separable from the packet whereby it may be discarded after it has been used. The card is free of any chemical substance which will selectively act to aid in forming an imprint of the fingerprint on the card. The packet further includes pressure-sensitive copying means for transferring data from the top sales slip to any underlying sales slips and to the card. The various members of the packet are held together by a tab at one end of the packet which is adapted to be torn therefrom for separating the members therefrom and from the packet.

Other objects and features will be in part apparent and in part pointed out hereinafter.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
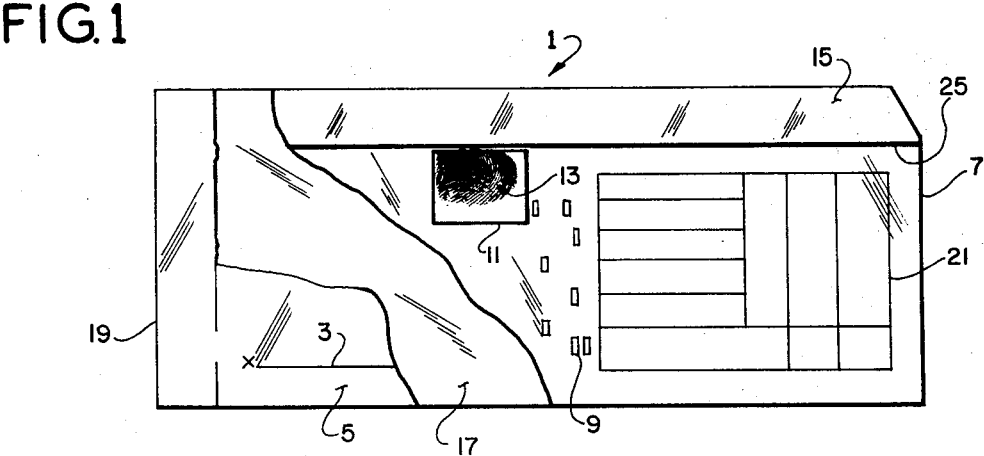
FIG. 1 is a plan view of a credit card sales slip packet of this invention, the various members of the packet being broken away to show a supply of fingerprinting medium applied to a narrow strip of paper included in the packet and for showing an area on a card in the packet in which the signer of the packet is required to imprint one of his fingerprints.

Referring to the drawings, a credit card sales slip packet made in accordance with this invention is indicated in its entirety by the reference numeral 1. It is adapted for signing as indicated at 3 by an authorized person to whom a credit card (not shown) has been previously issued and is further adapted for use as a system for identifying the actual signer of the packet by means other than the signature thereon at some time subsequent to the transaction. Packet 1 includes a plurality of members including at least one thin, flexible paper sales slip 5, and a relatively thick card 7 (sometimes called a record order card). This card has a substantially constant thickness and is adapted to have holes 9 punched therein for subsequent processing of the card by high-speed data processing equipment. Card 7 has an area 11 on which the signer of the packet is required to imprint one of his fingerprints as indicated at 13. Because the identity of the signer can be positively established by means of the fingerprint 13 imprinted on the card, it is contemplated that this invention will deter a significant number of persons from fraudulently signing credit card sales slips.

Packet 1 further includes a supply of a fingerprinting medium 15 which is immediately associated with card 7 for enabling the signer of the packet to press one of his fingertips (i.e., the tip of any finger or thumb) on the fingerprinting medium to transfer some of the fingerprinting medium over a sufficient area of his fingertip to imprint an identifiable fingerprint 13 on area 11 on the card. This supply of fingerprinting medium is separable from the packet and it is discarded after it has been used. The packet further includes sheets of carbon paper 17 disposed between the various packet members for transferring information from the top sales slip 5 to the underlying sales slips and to card 7. The packet members are held together by a tab 19 at one end (its left end as shown in FIGS. 1–3) which is adapted to be torn from the packet for separating the various members from one another.

As in conventional credit card sales slip packets, the sales slips 5 and the card 7 of the packets herein described have spaces 21 printed thereon for writing information pertaining to the sale, and are adapted to have data which is embossed on the customer's credit card (e.g., the customer's name, account number, address, etc.) imprinted on the packets by conventional credit card imprinting machines (not shown). In addition to the area 11, two small areas 23 are printed on card 7 in which the sales clerk may write a coded description of which of the signer's fingerprints were imprinted, for example, the clerk may write RT in the boxes if the signer's right thumbprint was imprinted.

Referring to FIG. 1, the supply of fingerprinting medium 15 is applied to a separate sheet of thin paper constituting a carrier sheet 25 which is included in the packet 1 and held therewithin by tab 19. As shown, carrier sheet 25 is substantially narrower than but the same length as card 7, but it will be understood that the carrier sheet could be the same width as the other members within the packet and have the fingerprinting medium applied over its entire surface or along a narrow strip if it is so desired. The carrier sheet is located within the packet in a position whereby it permits written information to be transferred to card 7 by the carbon paper 17. If the carrier sheet 25 cannot be placed immediately above card 7 as shown in FIG. 1 because it may interfere with the transferring of information to the card by the carbon paper, it may be placed immediately above carbon paper sheet 17 or below card 7 whereby it is still closely associated with the card for enabling the signer to readily imprint his fingerprint on the card.

Figure 2:
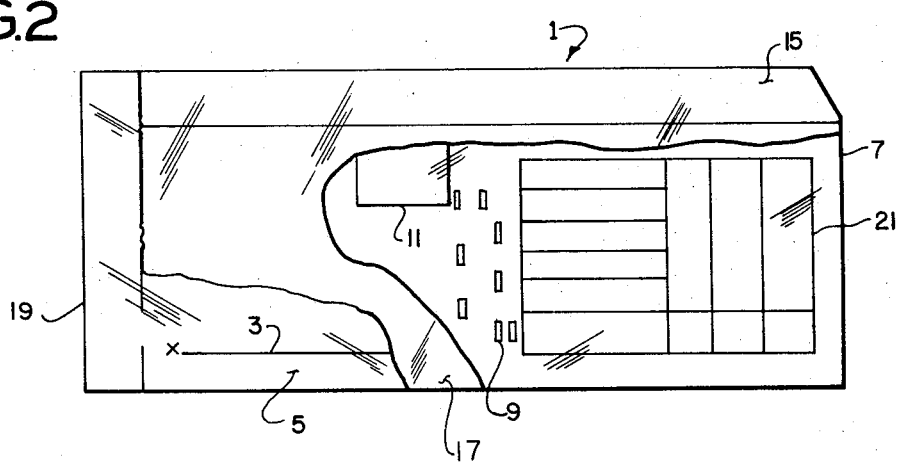
FIG. 2 is a view similar to FIG. 1 showing a modified credit card sales slip packet of this invention in which the supply of fingerprinting medium is applied to a carbon paper sheet.
Figure 3:
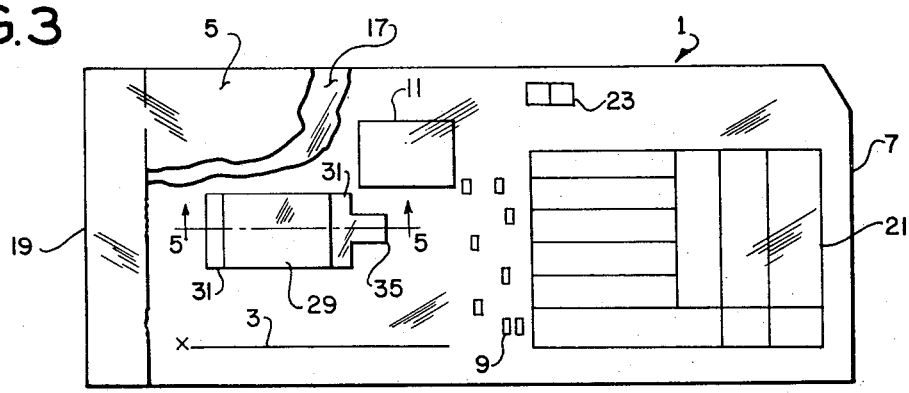
FIG. 3 is a view similar to FIG. 1 showing another credit card sales slip packet embodiment of this invention in which the supply of fingerprinting medium is carried by a wafer releasably adhered to the card.

In FIG. 2, a credit card sales slip packet is shown which is similar to the packet shown in FIG. 1 except that a lengthwise strip of fingerprinting medium 15 is applied to the upper surface of one of the carbon paper sheets 17 rather than on a separate carrier sheet 25. The sales slip packets shown in FIGS. 1 and 2 are particularly advantageous because they may be readily formed without any significant modification of conventional credit card sales slip packet manufacturing machinery.

Figure 4:
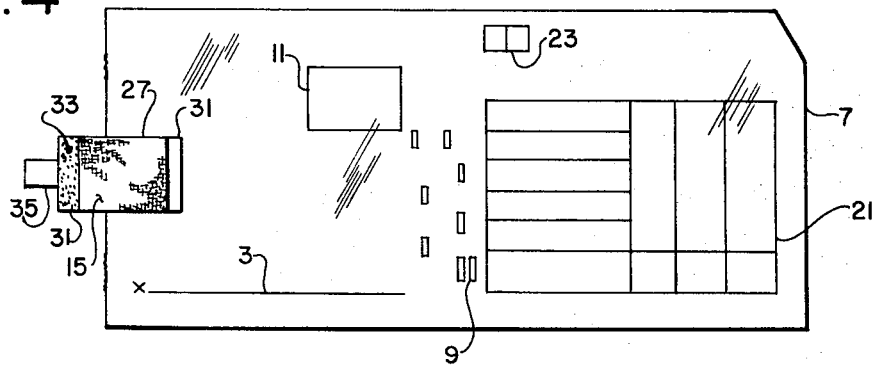
FIG. 4 is a plan view of the card shown in FIG. 3 with the wafer peeled back from the card to expose the supply of fingerprinting medium.
Figure 5:
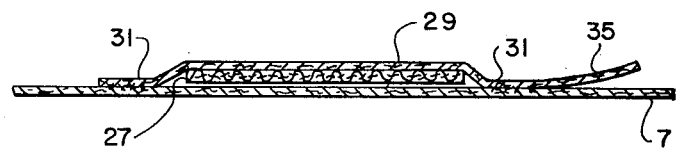
FIG. 5 is an enlarged vertical section on line 5—5 of FIG. 3.

As shown in FIGS. 3–7, the supply of fingerprinting medium 15 is carried by a wafer or patch 27 of thin, flexible cloth, for example, which is releasably secured to the card 7 in a manner as will appear. In FIGS. 3–5, the wafer 27 is permaneltly adhered to the underside of a cover 29 of flexible sheet material which is impermeable to the fingerprinting medium. Cover 29 is of larger area than wafer 27 and has margins 31 which extend out beyond the wafer. An adhesive 33 is applied to the under surface of these margins for releasably adhering cover 29 and wafer 27 to the card, adhesive 33 being of a type which permits the cover to be peeled from the card without damage to the card. Cover 29 has a finger tab 35 at one end to facilitate gripping of the cover for peeling it from the card to the position shown in FIG. 4 for exposing wafer 27 and for enabling the signer to press his fingertip thereon. As shown in FIG. 5, cover 29 overlies and protects wafer 27 prior to its being used.

Figure 6:
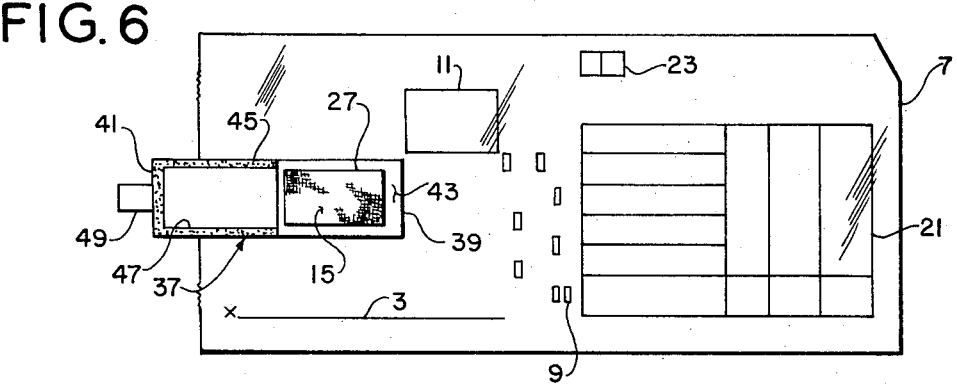
FIG. 6 is a view like FIG. 4 showing a modification of the manner in which the wafer is releasably adhered to the card.
Figure 7:
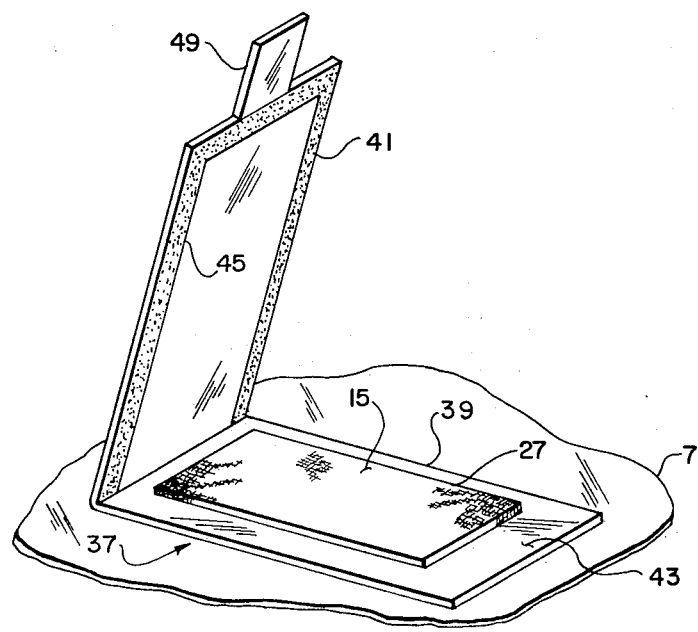
FIG. 7 is an enlarged perspective view of the wafer shown in FIG. 6.

A modification of the manner in which wafer 27 is releasably adhered to card 7 is shown in FIGS. 6 and 7 in which the wafer is permanently adhered to an elongate piece of sheet material, generally indicated at 37, which is impermeable to fingerprinting medium. More particularly, wafer 27 is adhered to the upper surface of one portion of piece 37, this portion constituting a base sheet 39, which is releasably adhered to card 7 by an adhesive material similar to the aforesaid adhesive 33. A second portion of piece 37, constituting a cover sheet 41 which corresponds to cover 29, is folded back over base sheet 39 to cover and protect wafer 27 thereon. Base sheet 39 and cover sheet 41 are of larger area than wafer 27 whereby their respective outer margins 43 and 45 extend out beyond wafer 27. An adhesive 47 is applied to the under surfaces of cover sheet margins 45 for releasably adhering the cover sheet to the base sheet for protecting wafer 27. Cover sheet 41 has a finger tab 49 at its free end to facilitate gripping of the cover sheet for peeling it from the base sheet 39 and for peeling the latter from the card.

With any of the credit card sales slip packets heretofore described, it will be noted that the fingerprinting medium 15 is carried by the packet whereby it is always available for use at any location where the customer is available to sign the sales slip (e.g., a service station driveway), and the fingerprinting medium is readily removable from the packet for permitting data processing of card 7.

Although any conventional ink or the like may be used for the fingerprinting medium 15, a fingerprinting medium is preferred which will not soil the fingers of the signer or other persons handling the card, and which will make a permanent impression of the signer's fingerprint without requiring a special construction or chemical treatment of the document to aid in imprinting the fingerprint 13. More particularly, the preferred fingerprinting medium 15 is a luminescent or fluorescent powder (e.g., certain fluorescent forms of the minerals halite or albite) which is substantially invisible in ordinary white light but which is visible when subjected to ultraviolet light. The powder is dispersed in an ink carrier (e.g., castor oil, petroleum jelly or the like) which permits the powder to be held on the member to which it has been applied (e.g., the paper strip 25, the carbon sheet 17 or the wafer 27) and to be transferred to the signer's fingertip when he presses his finger thereon, and which permits an impression of the signer's fingerprint to be imprinted on card 7. After the signer presses his coated finger on the card, the ink carrier is absorbed by the card leaving the luminescent powder on the card to form a permanent imprint conforming to the lines and whorls of the signer's fingertip whereby the identity of the signer may be readily established by a qualified fingerprint expert. Thus, card 7 may be of conventional card stock material which is free of any chemical substance which will selectively act to aid in forming an imprint of a fingerprint on the card. Furthermore, with a luminescent fingerprinting medium as above described, neither the signer nor other persons handling or using the card will become soiled and the fingerprinting medium will not visibly smear the card obliterating the information written or imprinted thereon.

By mixing more or less of the ink carrier with the luminescent powder, the consistency of the fingerprinting medium 15 may be varied from a relatively dry mixture to a wet paste-like mixture. As wetter mixtures may have a tendency to smear or to soak they are more conveniently used with the packets shown in FIGS. 6 and 7. The cover 29 and the cover sheet 41 of the packets shown in FIGS. 3–7 protect the ink carrier from drying or from being smudged on the surface of card 7 prior to its being removed to expose wafer 27. The impermeable base sheet 43 shown in FIGS. 6 and 7 prevents the ink carrier in the wetter mixtures from being absorbed into the card 7 in the area of the wafer.

In use, a sales clerk fills in the spaces 21 and imprints the information on the customer's credit card on a sales slip packet 1 of this invention in the same manner as he would fill out a conventional credit card sales slip packet. After the customer has signed his name on line 3, the sales clerk requests that the customer imprint one of his fingerprints on the card 7. If the packet as shown in FIG. 1 is used, the clerk folds back sales slip 5 and carbon sheet 17 thereby simultaneously exposing carrier sheet 25 with the fingerprinting medium 15 thereon and the area 11 on card 7. The clerk requests that the customer press his finger first on the fingerprinting medium and then on the area 11 to imprint an impression of the signer's fingerprint 13 thereon. If the packet shown in FIG. 2 is used, the clerk folds back sales slip 5 to expose the strip of fingerprinting medium on the upper side of carbon sheet 17. The customer presses his fingertip on the fingerprinting medium and the clerk folds back carbon sheet 17 to uncover card 7 and the customer then imprints his fingerprint 13 in area 11 on the card. If, however, the packets shown in FIGS. 3–5 are used, the clerk first tears away tab 19 to separate the members from the packet immediately after the customer has signed it (or he may fold back the sales slips 5 and carbon sheets 17) and then peels cover 29 back to expose wafer 27. The customer presses his fingertip first on the wafer and then on area 11 of the card to imprint his fingerprint 13 thereon. Cover 29 along with the wafer 27 are peeled from the card leaving it clear for data processing. The packet shown in FIGS. 6 and 7 is used in substantially the same manner as above described for the packet of FIGS. 3–5, except that after imprinting the fingerprint in area 11, base sheet 39 is peeled from the card. Regardless which of the packets are used, the sales clerk then writes a coded description in boxes 23 of which of the signer's fingerprints were imprinted, and tears tab 19 from the packet to separate the members from one another (if he has not previously done so). The clerk hands the sales slip 5 to the customer for his receipt, retains the card 7 and discards the carbon paper sheets 17 and the carrier sheet 25.

It will be understood that the area 11 need not be a definite outlined area on the card and that fingerprint 13 may be imprinted anywhere on the card, even on the back face of the card. It will be further understood that wafer 27 shown in the packets of FIGS. 3 and 6 may be adhered to the back face of card 7 rather than on the front face as shown.

Although the system of this invention has been described for use primarily with a credit card sales slip packet, it is contemplated that this identification and fraud protection system, especially the embodiments shown in FIGS. 3–7, may be used in conjunction with any document for use in a credit transaction which is adapted to be processed by high-speed data processing equipment (e.g., bank checks having magnetic numbers printed thereon).

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A credit card sales slip packet adapted for signing by an authorized person to whom a credit card has been issued and further adapted for use as a system for identifying the actual signer of the packet, the latter having a plurality of members including at least one thin, flexible sales slip, and a relatively thick card having a substantially constant thickness and adapted for high-speed processing by data processing equipment, said card having an area on which the signer of the packet is required to imprint one of his fingerprints, said packet further including a supply of a fingerprinting medium which is immediately associated with said card for enabling the signer of the packet to press one of his fingertips thereon to transfer said fingerprinting medium over a sufficient area of his fingertip to imprint an identifiable fingerprint on said area of the card, said supply of fingerprinting medium being separable from said packet whereby it may be discarded after it has been used, said card being free of any chemical substance which will selectively act to aid in forming an imprint of said fingerprint on said card, said packet further including pressure-sensitive copying means for transferring data from the top sales slip to the underlying sales slips and to the card, said members being held together by a tab at one end of the packet, said tab being adapted to be torn therefrom for separating said members from one another and from said packet.

2. A credit card sales slip packet as set forth in claim 1 wherein said fingerprinting medium is one which will not substantially soil the fingers of the signer or other persons handling the packet.

3. A credit card sales slip sales slip packet as set forth in claim 2 wherein said fingerprinting medium is a luminescent substance which is invisible in ordinary light and visible in ultraviolet light.

4. A credit card sales slip packet as set forth in claim 1 wherein said packet further comprises a carrier sheet having said supply of fingerprinting medium applied thereto, said carrier sheet being disposed in the packet whereby one of the members covers and protects said fingerprinting medium prior to its use.

5. A credit card sales slip packet as set forth in claim 4 wherein said carrier sheet is a strip of thin, flexible paper substantially narrower than but the same length as said card, said carrier sheet being fastened within said packet by said tab whereby said carrier sheet is readily separable from the other said members when said tab is torn therefrom.

6. A credit card sales slip packet as set forth in claim 1 wherein said copying means comprises carbon paper sheets disposed between said members, and said supply of fingerprinting medium is applied to and carried by one of said carbon paper sheets.

7. A credit card sales slip packet as set forth in claim 6 wherein said supply of fingerprinting medium is applied to said one sheet in the form of a strip extending lengthwise thereof.

8. A credit card sales slip packet as set forth in claim 1 wherein said supply of fingerprinting medium is applied to a wafer which is carried by said card, said wafer being protected by a cover, said cover and said wafer being removable from the card to permit data processing of the latter.

9. A credit card sales slip packet as set forth in claim 8 wherein said wafer is a patch of thin, flexible material treated with said fingerprinting medium.

10. A credit card sales slip packet as set forth in claim 9 wherein said cover is a piece of sheet material impermeable to fingerprinting medium and of slightly larger area than said wafer and having adhesive applied to its lower margins which extend out beyond said wafer for adhering the cover to said card, said cover having a finger tab along one edge facilitating peeling of said cover from said card to expose said wafer.

11. A credit card sales slip packet as set forth in claim 10 wherein said wafer is adhered to the underside of the cover and is removable from the card with the cover.

12. A credit card sales slip packet as set forth in claim 9 in which said wafer is adhered to the upper surface of one portion of an elongate piece of sheet material, the lower surface of said one portion being releasably adhered to said card, said sheet material being impermeable to said fingerprinting medium and having a second portion constituting said cover which is folded back over said first portion for covering said wafer, said first portion and said cover being of larger area than said wafer, said cover having adhesive applied to its lower margins which extend out beyond said wafer for releasably adhering said cover to the upper surface of said first portion, said cover being adapted to be peeled from said first portion for exposing said wafer, and said first portion being adapted to be peeled from said card for permitting data processing of the card.

13. A credit card sales slip packet as set forth in claim 1 wherein said card includes another area on which may be recorded a description of which one of the signer's fingerprints has been imprinted.

14. A credit card sales slip packet as set forth in claim 3 wherein said luminescent substance is a powder dispersed in an ink carrier, the latter permitting said powder to be transferred to the fingertip of the signer when he presses his fingertip on said supply of fingerprinting medium and permitting an impression of the signer's fingerprint to be imprinted on the card when he presses his coated fingertip thereon.

15. A sales slip packet for use in a credit card sales transaction and adapted for signing by an authorized person to whom a credit card has been issued and further adapted for use as a system for identifying the actual signer of the sales slip packet, the latter having a flexible sales slip and a relatively thick card having a substantially constant thickness and adapted for high-speed processing by data processing equipment and pressure-sensitive copying means between the sales slip and the card for transferring data from the sales slip to the card, said card having an area on which the signer of the sales slip packet is required to imprint one of his fingerprints, said card carrying a wafer holding a supply of a fingerprinting medium, said wafer being of sufficient area to permit the signer to press one of his fingertips thereon to transfer said fingerprinting medium over a sufficient area of his fingertip to imprint an identifiable fingerprint on said area of the card, said fingerprinting medium being one which will not substantially soil the fingers of the signer or other persons handling the card, said card being free of any chemical substance which will selectively act to aid in forming an imprint of said fingerprint on said card, and a cover overlying and protecting said wafer, said cover being releasably adhered to the card and being adapted to be peeled away from the card to expose said wafer, said cover and said wafer being removable from the card to permit data processing of the card.

\* \* \* \* \*